United States Patent
Hanaoka

(10) Patent No.: US 12,466,116 B2
(45) Date of Patent: Nov. 11, 2025

(54) MOLD-CLAMPING MACHINE

(71) Applicant: NISSEI PLASTIC INDUSTRIAL CO., LTD., Nagano (JP)

(72) Inventor: Masaru Hanaoka, Nagano (JP)

(73) Assignee: NISSEI PLASTIC INDUSTRIAL CO., LTD., Nagano (JP)

( * ) Notice: Subject to any disclaimer, the term of this patent is extended or adjusted under 35 U.S.C. 154(b) by 0 days.

(21) Appl. No.: 17/928,656

(22) PCT Filed: Jun. 16, 2022

(86) PCT No.: PCT/JP2022/024045
§ 371 (c)(1),
(2) Date: Nov. 30, 2022

(87) PCT Pub. No.: WO2023/100398
PCT Pub. Date: Jun. 8, 2023

(65) Prior Publication Data
US 2024/0149514 A1 May 9, 2024

(30) Foreign Application Priority Data
Dec. 1, 2021 (JP) .................... 2021-195061

(51) Int. Cl.
*B29C 45/67* (2006.01)
*B29C 45/17* (2006.01)

(52) U.S. Cl.
CPC ...... *B29C 45/6707* (2013.01); *B29C 45/1744* (2013.01)

(58) Field of Classification Search
CPC ............ B29C 45/6707; B29C 45/1744; B29C 2045/1763; B29C 45/1761; B29C 45/68;
(Continued)

(56) References Cited

U.S. PATENT DOCUMENTS 3,935,791 A * 2/1976 Hehl ..................... F15B 15/204
425/451.2
4,948,358 A * 8/1990 Kushibe .............. B29C 45/6728
425/589
(Continued)

FOREIGN PATENT DOCUMENTS

CN 103692608 A * 4/2014 ............ B29C 45/03
CN 110884027 A * 3/2020
(Continued)

OTHER PUBLICATIONS

Karasawa, T., et al. "English Machine Translation of JP-2019217753-A". 2024. EPO. Espacenet. (Year: 2024).*
(Continued)

*Primary Examiner* — Susan D Leong
*Assistant Examiner* — Jonathan B Woo
(74) *Attorney, Agent, or Firm* — Rankin, Hill & Clark LLP

(57) ABSTRACT

A mold-clamping machine includes a pressure receiving mount, a turn table mounted on the pressure receiving mount so as to be freely turnable, a movable mount placed at a position higher than the turn table, tie bars attached to and extending downwardly from the movable mount, and which pass completely through the pressure receiving mount and a traction mount. The mold-clamping machine clamps a metal mold by moving down the traction mount with reference to the pressure receiving mount. Each of the tie bars is freely movable up and down by each of first to third cylindrical guides provided at the pressure receiving mount. The second cylindrical guide and the third cylindrical guide each include a rectangular flange portion fastened to the pressure receiving mount, and respective attachment attitudes of the second cylindrical guide and the third cylindrical guide are adjustable.

7 Claims, 10 Drawing Sheets

(58) Field of Classification Search
CPC ...... B29C 2045/6757; B29C 2045/688; B29C 45/06; B29C 45/64; B29C 45/00; B29C 2045/00; B29C 33/20; B29C 33/202; B29C 33/22; B29C 33/24; B29C 33/30; B29C 33/305; B29C 33/307; B29C 33/308; B29C 43/58; B29C 2043/5833; B29C 2043/5858
See application file for complete search history.

(56) References Cited

U.S. PATENT DOCUMENTS

| | | | | |
|---|---|---|---|---|
| 5,135,385 | A * | 8/1992 | Fukuzawa | B29C 45/6707 425/589 |
| 2001/0048954 | A1 * | 12/2001 | Tamaki | B29C 45/67 425/593 |
| 2003/0003178 | A1 * | 1/2003 | Kami | B22D 17/266 425/451.2 |
| 2003/0082260 | A1 * | 5/2003 | Kishi | B29C 45/1761 425/589 |
| 2005/0233029 | A1 * | 10/2005 | Yamanaka | B29C 45/1761 425/593 |
| 2006/0228438 | A1 * | 10/2006 | Koike | B29C 45/1761 425/472 |
| 2013/0309350 | A1 * | 11/2013 | Ikeda | B29C 45/4005 425/589 |
| 2014/0295020 | A1 * | 10/2014 | Senga | B29C 45/66 425/593 |
| 2021/0078229 | A1 * | 3/2021 | Murata | B29C 45/68 |

FOREIGN PATENT DOCUMENTS

| | | | | |
|---|---|---|---|---|
| GB | 2540386 A | * | 1/2017 | ............ G01R 33/38 |
| JP | 2000190332 A | * | 7/2000 | |
| JP | 2001-212856 | | 8/2001 | |
| JP | 2011121210 A | * | 6/2011 | |
| JP | 2013146960 A | * | 9/2013 | ......... B29C 45/1742 |
| JP | 2019217753 A | * | 12/2019 | |
| WO | WO-2009123312 A1 | * | 10/2009 | ............ B29C 45/17 |

OTHER PUBLICATIONS

Aso, M., et al. "English Machine Translation of JP-2000190332-A". 2024. EPO. Espacenet. (Year: 2024).*
Nishida, S., et al. "English Machine Translation of JP-2011121210-A". 2024. EPO. Espacenet. (Year: 2024).*
Li, G., et al. "English Machine Translation of CN-103692608-A". 2024. EPO. Espacenet. (Year: 2024).*
Atsushi, K., et al. "English Machine Translation of WO-2009123312-A1". 2024. EPO. Espacenet. (Year: 2024).*
Liao, X., et al. "English Machine Translation of CN-110884027-A". 2024. EPO. Espacenet. (Year: 2024).*
Ichihara, T., et al. "English Machine Translation of JP-2013146960-A". 2024. EPO. Espacenet. (Year: 2024).*

* cited by examiner

MOLD-CLAMPING MACHINE

TECHNICAL FIELD

The present disclosure relates to a mold-clamping machine that clamps a metal mold.

BACKGROUND ART

According to injection molding technologies, a molten resin is injected from an injection apparatus to a cavity within a metal mold. After the molten resin is solidified, the metal mold is opened to obtain a product.

At the time of injection, it is necessary to clamp the metal mold in such a way that the metal mold is not opened by filling pressure. An apparatus that clamps the metal mold is a mold-clamping machine.

A mold-clamping machine includes a stationary mount and a movable mount. A stationary mold that is a part of the metal mold is attached to the stationary mount, and a movable mold that is the remaining part of the metal mold is attached to the movable mount.

When the movable mount is not in parallel with the stationary mount, the movable mold does not uniformly contact the stationary mold. Hence, it is essential that the movable mount should be in parallel with the stationary mount.

The mold-clamping machine is an ensemble of a plurality of components, and there is a variability in size of each component. Hence, the movable mount cannot be completely in parallel with the stationary mount.

Although it is slight, each component deforms when receiving external force. Accordingly, when the non-parallelism is within an allowable range, it is considered that the movable mold is in parallel with the stationary mold.

When, however, the non-parallelism exceeds the allowable range, this becomes a contributory factor for early worn-out of the mold-clamping machine and for improper molding.

In order to address such a technical problem, a mold-clamping machine provided with an inclination adjusting mechanism has been proposed (see, for example, Patent Document 1).

Patent Document 1 discloses a mold-clamping machine that has a movable platen attached to tie bars that extend horizontally through an inclination adjusting device.

The inclination adjusting device includes a left wedge (a second wedge) and a right wedge (a first wedge), causes the movable platen to be rotated clockwise by pushing in the left wedge, and causes the movable platen to be rotated counterclockwise by pushing in the right wedge.

When the horizontal direction is defined as an x-axis, the back-and-forth direction is defined as a y-axis, and the height direction is defined as a z axis, Patent Document 1 discloses a technology of adjusting the inclination of the movable platen around the y-axis. Note that the x-axis, the y-axis and the z-axis may be also referred to as a mold-clamping axis, an orthogonal axis to the mold-clamping axis, and an axis orthogonal to the mold-clamping axis and the y-axis, respectively.

Meanwhile, for mold-clamping machines, adjustment of inclination around the z-axis is also necessary. However, the technology disclosed in Patent Document 1 cannot cope with such adjustment.

If an inclination adjusting mechanism around the z-axis is added to the inclination adjusting device of Patent Document 1, the inclination adjusting device increases the size entirely, and becomes complicated. When the size is large and it is complicated, it becomes expensive.

Upon a request for a cost-down of a mold-clamping machine, a mold-clamping machine which is compact, simple and inexpensive is desired although it can adjust the inclination of a movable mount around the y-axis and the z-axis.

CITATION LIST

Patent Literatures

Patent Document 1: JP 2001-212856A

SUMMARY OF INVENTION

Technical Problem

An objective of the present disclosure is to provide a mold-clamping machine which is compact, simple and inexpensive although it can adjust the inclination of a movable mount around the y-axis and the z-axis.

Solution to Problem

According to the first example embodiment of the present disclosure, a mold-clamping machine includes:
- a bed fastened to a floor or a machine stand;
- a pressure receiving mount fastened to the bed;
- a turn table mounted on the pressure receiving mount so as to be freely turnable;
- a movable mount placed at a position higher than the turn table;
- a traction mount placed at a position lower than the pressure receiving mount;
- a tie bar which is attached to the movable mount so as to extend downwardly, and which passes completely through the pressure receiving mount and the traction mount; and
- a mold-clamping mechanism that moves down the traction mount relative to the pressure receiving mount so as to move down the tie bar and the movable mount.

An engage portion is provided at a lower end of the tie bar, and a half nut that is engaged with the engage portion is provided under the traction mount.

The mold-clamping machine clamps a metal mold placed between the turn table and the movable mount.

The tie bar includes:
- a first tie bar placed at a rotation center of the turn table; and
- second and third tie bars placed outside the turn table in a planar view.

Each of the first to third tie bars is supported so as to be freely movable up and down by each of first to third cylindrical guides provided at the pressure receiving mount.

The second cylindrical guide and the third cylindrical guide each include a rectangular flange portion fastened to the pressure receiving mount, and respective attachment attitudes of the second cylindrical guide and the third cylindrical guide are adjustable by placing a shim between one of a plurality of sides of the rectangular flange portion and the pressure receiving mount.

According to the second example embodiment of the present disclosure, in the mold-clamping machine according to the first example embodiment, it is preferable that:

the rectangular flange portion should be an intermediate-position flange mounted on the pressure receiving mount; and the intermediate-position flange should include a detachable jack-up bolt utilized when the shim is inserted or replaced, and the intermediate-position flange should be lifted up from the pressure receiving mount by the jack-up bolt.

According to the third example embodiment of the present disclosure, in the mold-clamping machine according to the second example embodiment, it is preferable that:

the second cylindrical guide and the third cylindrical guide should be each fastened to the pressure receiving mount by a fastening bolt;

the jack-up bolt should be screwed in a female screw portion provided at the intermediate-position flange when the fastening bolt is detached; and the female screw portion should also serve as a bolt hole for the fastening bolt.

According to the fourth example embodiment of the present disclosure, in the mold-clamping machine according to the first example embodiment, it is preferable that:

the rectangular flange portion should be a lower-position flange that contacts a lower surface of the pressure receiving mount, and the lower-position flange should be fastened to the pressure receiving mount by a long bolt that passes completely through the pressure receiving mount from an upper side to a lower side; and a clearance to insert the shim is formed between the pressure receiving mount and the lower-position flange by loosening the long bolt.

Advantageous Effects of Invention

According to the first example embodiment of the present disclosure, the mold-clamping axis (an X-axis) is vertical, and the tie bar that extends vertically is fastened to the movable mount, but is not fastened to the pressure receiving mount located at a lower position thereof, and the traction mount located at a lower position thereof. In addition, the tie bar is supported so as to be movable up and down by the cylindrical guide provided at the pressure receiving mount. When the cylindrical guide is inclined, the tie bar is also inclined.

The cylindrical guide includes the rectangular flange portion, and when the shim is inserted under one of the plurality of sides of the rectangular flange portion, the cylindrical guide is inclined around an axis (a Y-axis) orthogonal to the mold-clamping axis and an axis (a Z-axis) orthogonal to the Y-axis. This shim is quite thin, is lightweight, and is inexpensive. Even is such a shim is added, the mold-clamping machine does not increase the size, does not become complicated, and does not become expensive.

Hence, according to the present disclosure, a mold-clamping machine which is compact, simple and inexpensive is provided although it can adjust the inclination of a movable mount around the Y-axis and the Z-axis.

According to the second example embodiment of the present disclosure, when the shim is inserted or the shim is replaced, the intermediate-position flange is lifted up from the pressure receiving mount by the jack-up bolt. The jack-up bolt is lightweight and inexpensive. Even if such a jack-up bolt is utilized, the mold-clamping machine does not increase the size, does not become complicated, and does not become expensive.

When a bolt hole through which a fastening bolt passes through, and a female screw portion in which the jack-up bolt is screwed are separately formed in the intermediate-position flange, the intermediate-position flange increases the size.

In this point, according to the third example embodiment of the present disclosure, since the bolt hole and the female screw portion are common, downsizing of the intermediate-position flange can be accomplished.

According to the fourth example embodiment of the present disclosure, the cylindrical guide is hung from the pressure receiving mount by the long bolt, and a clearance to insert the shim can be formed by simply loosening the long bolt. Since the jack-up bolt is unnecessary, the mold-clamping machine can be simplified.

DESCRIPTION OF EMBODIMENTS

Embodiments of the present disclosure will be described with reference to the accompanying figures. Note that regarding a cylinder, a term "elongate" means that a piston rod is moved forward so as to elongate an entire cylinder length, and a term "shorten" means that the piston rod is retracted so as to shorten the entire cylinder length.

EMBODIMENTS

Figure 1:
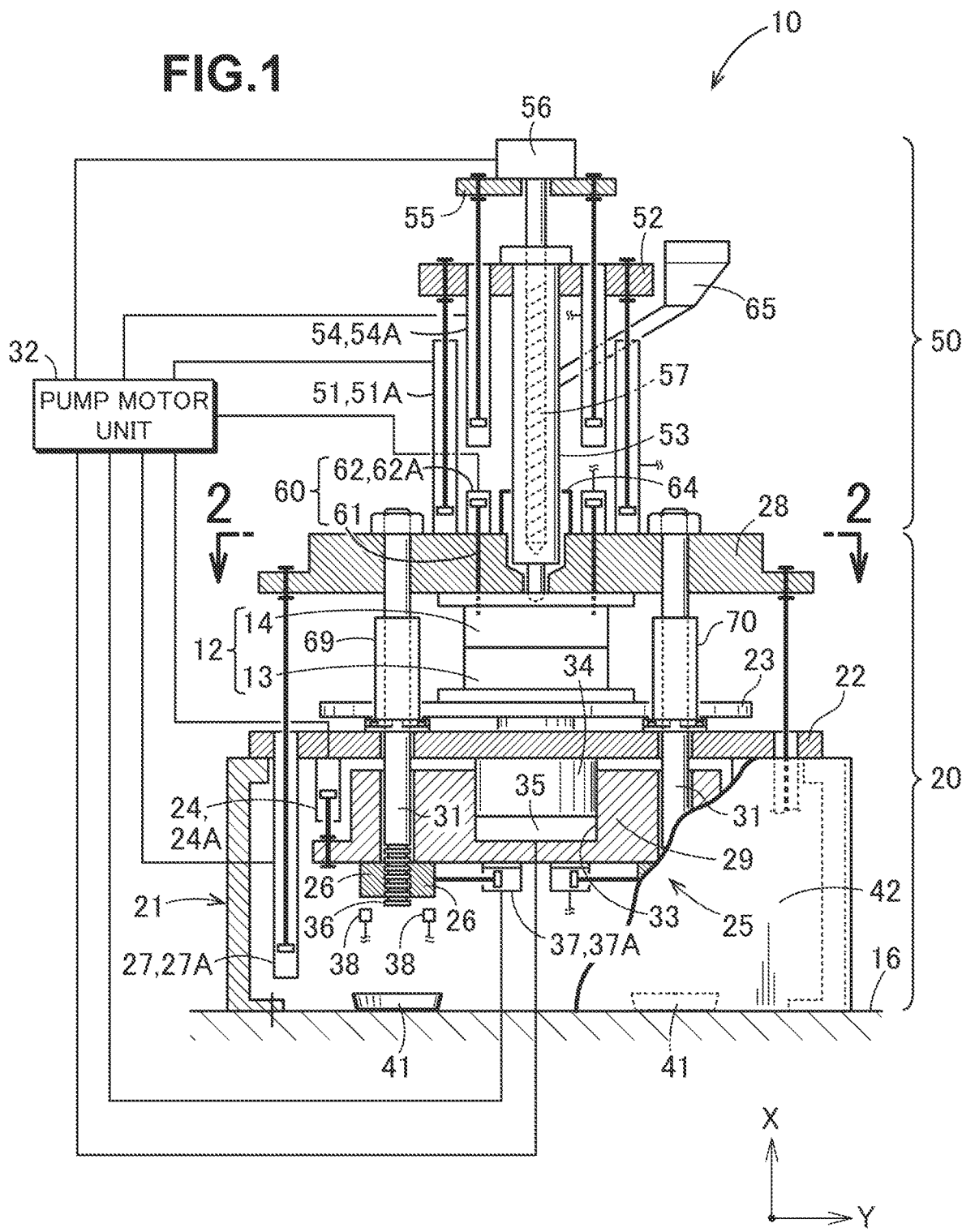
FIG. 1 is a diagram illustrating an entire structure of an injection molding apparatus including a mold-clamping machine according to the present disclosure.

FIG. 1 illustrates an X-Y direction. an X-axis is a vertical axis, and a Y-axis is a horizontal axis. Note that the X-axis corresponds to a mold-clamping axis, and the Y-axis is also an axis that is orthogonal to the mold-clamping axis.

As illustrated in FIG. 1, an injection molding apparatus 10 is an apparatus that mainly includes a mold-clamping machine 20 that clamps a metal mold 12 which has a vertical mold-clamping axis and which includes a lower mold 13 and an upper mold 14, and an injection apparatus 50 which is placed vertically above the mold-clamping machine 20.

The mold-clamping machine 20 includes a bed 21 fastened to a floor (or a machine stand) 16, a pressure receiving mount 22 fastened to the bed 21, a turn table 23 placed on the pressure receiving mount 22, a traction mount 29 which is placed under the pressure receiving mount 22 and which is moved up and down by a half-nut position adjusting mechanism 24 provided at the pressure receiving mount 22, a half nut 26 placed under the traction mount 29 that includes a mold-clamping cylinder 33, a movable mount 28 which is placed above the pressure receiving mount 22 and which is moved up and down by a mold opening-and-closing mechanism 27 of the pressure receiving mount 22, tie bars 31 which are provided at the movable mount 28 so as to extend downwardly and which pass completely through the pressure receiving mount 22 and the traction mount 29, and a pump motor unit 32 that supplies hydraulic pressure to the half-nut position adjusting mechanism 24, the mold-clamping cylinder 33, and the mold opening-and-closing mechanism 27, etc.

Cylindrical guides 69 and 70 are provided on the pressure receiving mount 22. The cylindrical guides 69 and 70 restrict the respective tie bars 31 to move along the Y-axis, but allows those to move along the X-axis (moving up and down). The detailed structures of the cylindrical guides 69 and 70 and the actions thereof will be described later.

A half-nut position adjusting hydraulic cylinder 24A is suitable as the half-nut position adjusting mechanism 24. Similarly, the mold-clamping cylinder 33 is preferable as a mold-clamping mechanism 25, and a mold opening-and-closing hydraulic cylinder 27A is preferable as the mold opening-and-closing mechanism 27.

Note that the pressure receiving mount 22 can be removed from the bed 21 by loosening bolts, etc. Hence, the term "fasten" covers not only complete fastening but also separable coupling according to the present disclosure.

Moreover, the half-nut position adjusting mechanism 24 and the mold opening-and-closing mechanism 27 may be provided in the bed 21.

The mold-clamp mechanism 25 includes the mold-clamping cylinder 33 that is opened, for example, upwardly. A piston portion 34 extended downwardly from the pressure receiving mount 22 is fitted in the mold-clamping cylinder 33. A hydraulic chamber 35 is formed between the mold-clamping cylinder 33 and the piston portion 34. When a hydraulic fluid is supplied to the hydraulic chamber 35, the traction mount 29 moves down.

Each tie bar 31 is provided with an engage portion 36 at a lower end. An example engage portion 36 is a saw-teeth portion. In the following description, the engage portion 36 will be referred to as a saw-teeth portion 36.

The half nut 26 is engaged (meshed) with the saw-teeth portion 36 serving as the engage portion. The half nut 26 is opened and closed by a half-nut opening-and-closing mechanism 37 provided on the traction mount 29. A preferable half-nut opening-and-closing mechanism 37 is a half-nut opening-and-closing hydraulic cylinder 37A.

It is preferable that the saw-teeth portion 36 should have the teeth arranged at an equal pitch like a knot of a bamboo. The tooth may be formed in any one of a rectangular cross-sectional shape, a trapezoidal cross-sectional shape, and a triangular cross-sectional shape. Corresponding teeth are formed at the half nut 26.

Each tie bar 31 and each half nut 26 are formed of robust and hard steel. In order to make the contact of steel portions smooth, a grease lubrication is applied between the saw-teeth portion 36 and the half nut 26. The grease is applied to the outer circumferential surface of each tie bar 31 at a position higher than the saw-teeth portion 36. The grease moves down and reaches the saw-teeth portion 36. The grease application may be performed by automatic scheme or manual scheme.

Preferably, a half-nut actuation monitoring mechanism 38 that monitors the actuation of the half nut 26 is provided near the half nut 26. However, with a condition such that the position controls on the mold opening-and-closing mechanism 27 and on the half-nut position adjusting mechanism 24 can be executed precisely, the half-nut actuation monitoring mechanism 38 may be omitted.

Regarding the half-nut actuation monitoring mechanism 38, an arbitrary sensor, such as a proximity switch or a limit switch, is applicable. Among those, the proximity switch is a non-contact type sensor that determines as "an object being present" when an objective metal comes close within a certain distance, and as "no object being present" when the objective metal is apart beyond the certain distance. Although the half nut 26 is covered with a waste grease, in the case of the non-contact type sensor, a possibility of a false detection can be reduced. In addition, it is inexpensive. Hence, a proximity switch is recommended.

Preferably, a tray 41 that catches the waste grease is placed under the half nut 26 and on the floor 16. The tray 41 is a container in a dish shape. Dirt on the floor 16 can be suppressed by taking out the tray 41 at a constant cycle or as needed, and by disposing the collected waste grease.

Preferably, the bed 21 is surrounded by a cover 42. The cover 42 functions as a safety cover. By surrounding the bed 21 with the cover 42, the appearance of the mold-clamping machine 20 improves. However, since it can be substituted with a safety fence, etc., the cover 42 is not essential.

The injection apparatus 50 includes an injection apparatus moving mechanism 51 that stands upright on the movable mount 28, an injection stage 52 supported by the injection apparatus moving mechanism 51, a heating cylinder 53 extended downwardly and supported by the injection stage 52, an injection mechanism 54 which is provided on the injection stage 52 and which has a piston rod extended upwardly, a screw driving stage 55 supported by the injection mechanism 54, a screw rotating mechanism 56 supported by the screw driving stage 55, and a screw 57 which is extended downwardly from the screw rotating mechanism 56 and which enters in the heating cylinder 53. An example screw rotating mechanism 56 is a hydraulic motor.

A preferable injection apparatus moving mechanism 51 is an injection apparatus moving hydraulic cylinder 51A, and a preferable injection mechanism 54 is an injection cylinder 54A.

Further preferably, a purging cover 64 that surrounds the heating cylinder 53 is provided on the movable mount 28. Moreover, upper mold ejectors 60 are provided at the movable mount 28. Each upper mold ejector 60 includes an ejector pin 61 extended to an upper mold 14, and a pin moving mechanism 62 that moves the ejector pin 61, and has a role of pushing down a runner that remains in the upper mold 14. A preferable pin moving mechanism 62 is a pin moving hydraulic cylinder 62A.

Figure 2:
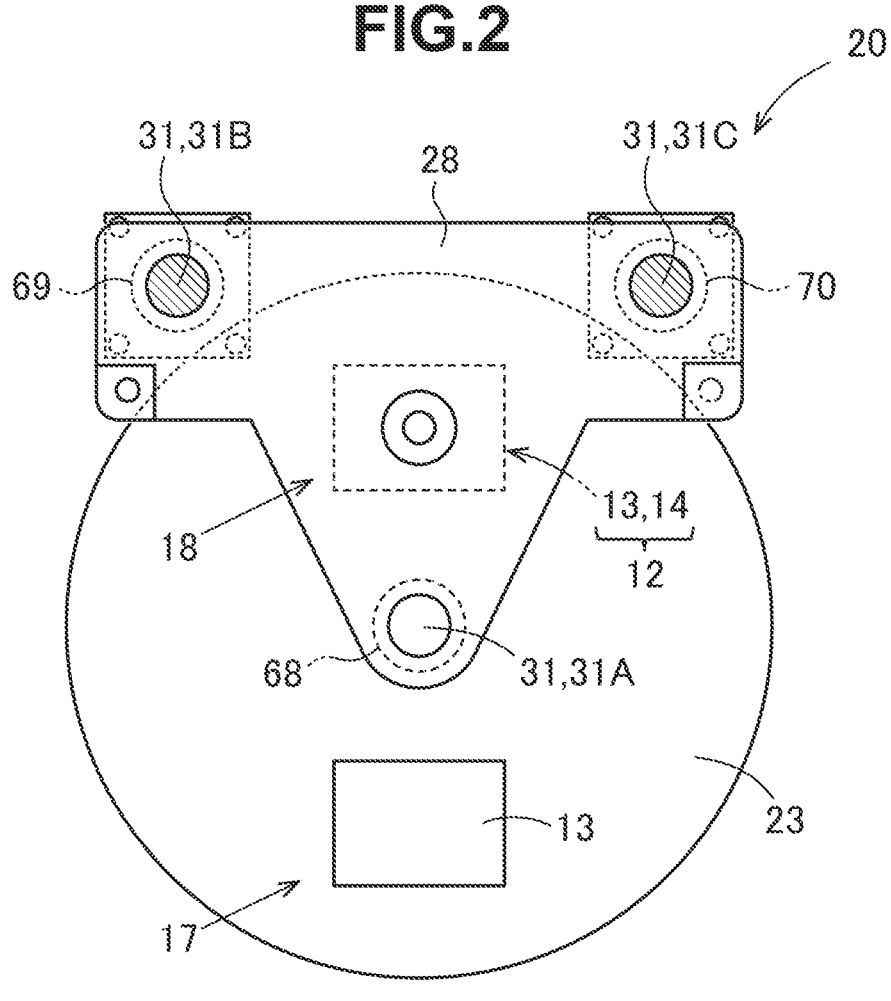
FIG. 2 is a diagram as viewed across an arrow 2-2 in FIG. 1.

FIG. 2 is a diagram as viewed across an arrow 2-2 in FIG. 1. In the figure, a Z-axis is an axis orthogonal to the Y-axis, and is also an axis orthogonal to the X-axis (see FIG. 1).

As illustrated in FIG. 2, the tie bars 31 are placed at respective vertices of a triangle. Among those, the one tie bar 31 is a first tie bar 31A placed at the rotation center of the turn table 23.

The other two tie bars 31 are a second tie bar 31B and a third tie bar 31C which are placed outside the turn table 23 in a planar view.

At a product taken-out position 17, a resin-molding product is taken out from a lower mold 13. The empty lower mold 13 is transferred to a mold-clamping position 18 by rotating the turn table 23 by 180 degrees.

Since a product take-out work and a mold-clamping work can be carried out simultaneously, the productivity can be improved by adopting the turn table 23.

In the mold-clamping machine 20 in FIG. 1, the half nut 26 is opened and is separated from the saw-teeth portion 36. Next, the mold opening-and-closing mechanism 27 is elongated, and the movable mount 28 is moved up. As the movable mount 28 moves up, the upper mold 14 is separated from the lower mold 13, and the tie bars 31 are moved up.

Moreover, in the injection apparatus 50, the injection apparatus moving mechanism 51 is elongated, and the injection stage 52 is moved up. As the injection stage 52 moves up, the heating cylinder 53 is separated from the upper mold 14.

Figure 3:
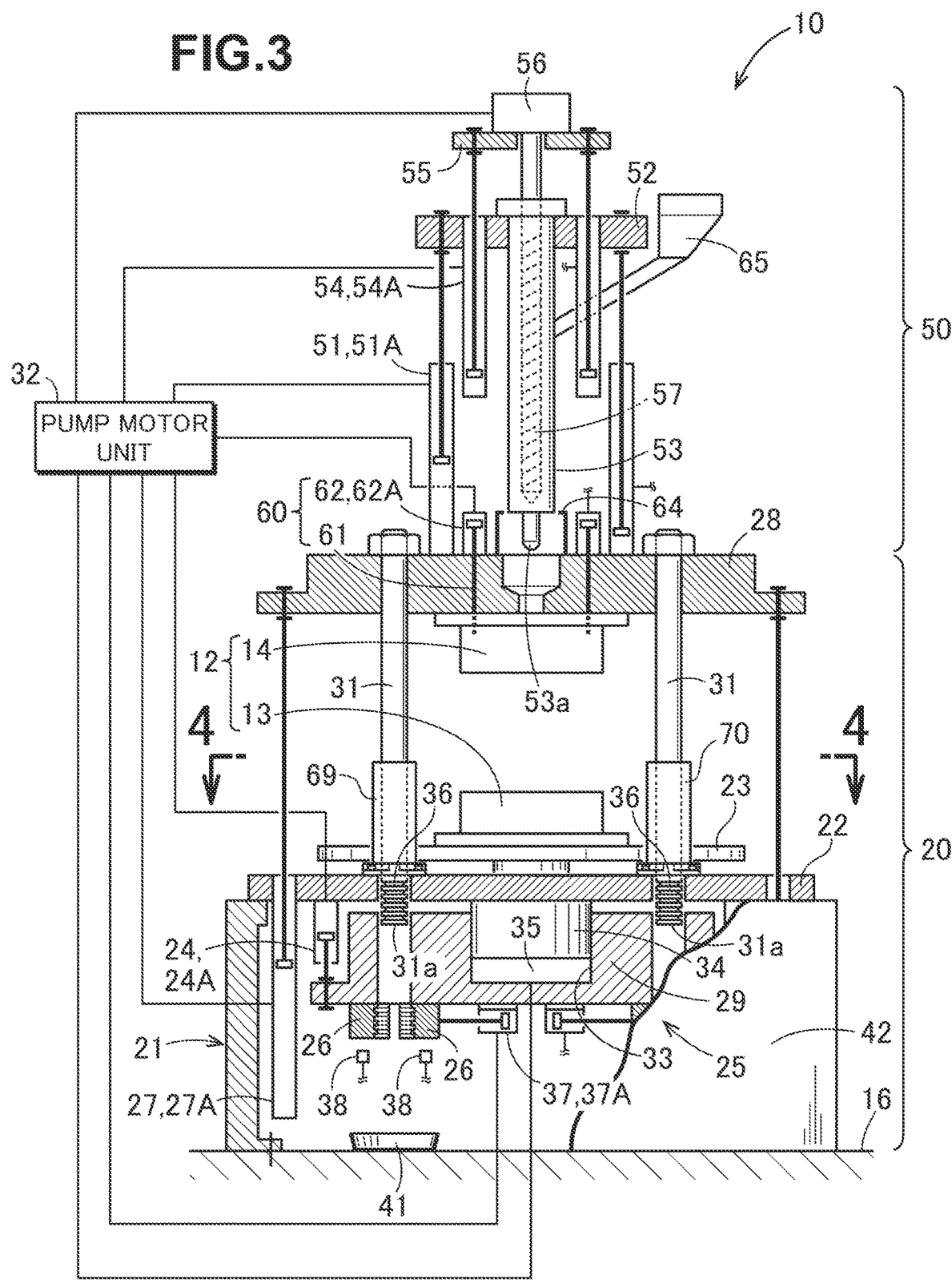
FIG. 3 is a diagram for describing an action of the injection molding apparatus.

The results of the above operations are illustrated in FIG. 3. FIG. 3 illustrates a state in which the mold is opened maximally.

As illustrated in FIG. 3, a lower end surface 31a of each tie bar 31 is moved up in the traction mount 29. Consequently, the tie bar 31 can be sufficiently shortened. When the tie bar 31 is short, the tie bar 31 can be lightweight, and the material thereof can be saved.

That is, according to conventional technologies, a structure is preferable in which the lower end surface 31a of each tie bar 31 is always located outside the traction mount 29. In contrast, according to the structure in FIG. 3, the tie bar 31 can be remarkably shortened.

Moreover, a purging work may be carried out by lifting up the heating cylinder 53 so as to eject the accumulated resin material. This purging work is also called as a discarding shot process. In the discarding shot process, although the resin material falls out from a nozzle 53a, fly-out of the resin material is prevented by the purging cover 64. A worker releases the purging cover 64 as needed or as appropriate so as to remove the accumulated resin material.

According to the present disclosure, the purging cover 64 that surrounds the nozzle 53a can be easily placed on the movable mount 28.

In the injection molding apparatus 10, the actuations of the mold-clamping machine 20 and the actuations of the injection apparatus 50 are executed simultaneously.

First, the actuations of the mold-clamping machine 20 will be described.

In FIG. 3, the mold opening-and-closing mechanism 27 is shortened, and the movable mount 28, the upper mold 14, and the tie bars 31 are moved down. When the upper mold 14 abuts the lower mold 13, the moving-down actuations of the respective tie bars 31 complete.

There is a difference in phase between the saw-teeth portion 36 and the half nut 26. The traction mount 29 is slightly moved up and down by the half-nut position adjusting mechanism 24 so as to make such a phase zero. After the adjustment ends, the half-nut opening-and-closing mechanism 37 is elongated, and the half nut 26 is caused to be meshed with the saw-teeth portion 36.

If the meshing is improper, this can be detected by the half-nut actuation monitoring mechanism 38. In the case of the improper meshing, an injection molding work is suspended, and such an improper meshing is to be addressed.

When no improper meshing is detected, in FIG. 1, a hydraulic fluid is supplied to the hydraulic chamber 35 of the mold-clamping cylinder 33. This causes the traction mount 29 to move down, the tie bars 31 are pulled down, and the movable mount 28 moves down. Through the above actuations, the metal mold 12 is clamped.

Figure 4:
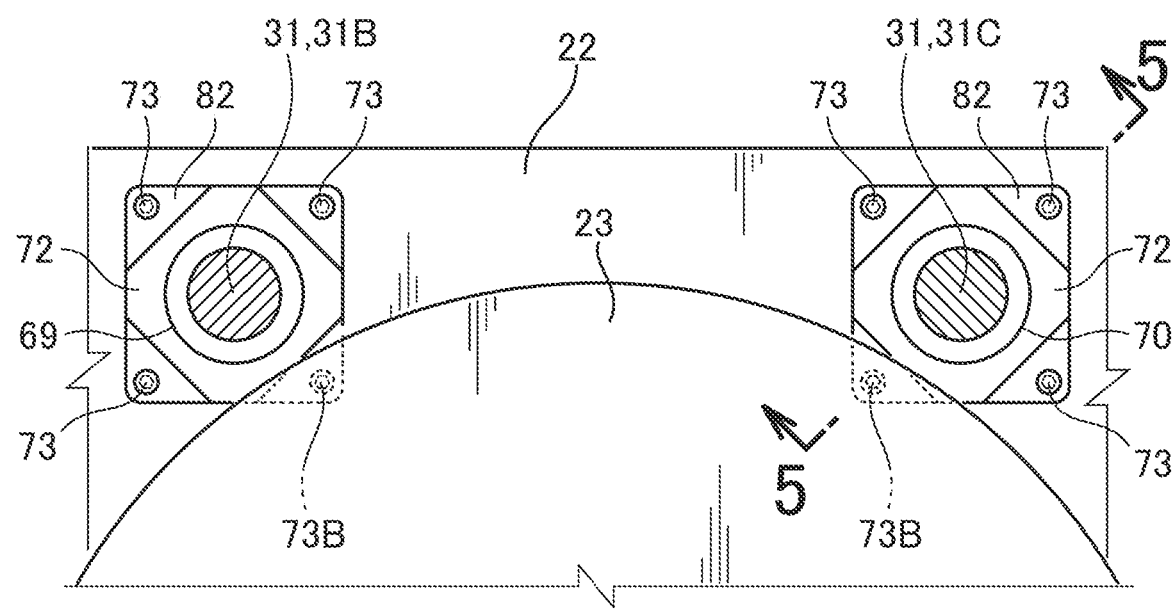
FIG. 4 is a diagram as viewed across an arrow 4-4 in FIG. 3.

As illustrated in FIG. 4, the second cylindrical guide 69 and the third cylindrical guide 70 are arranged outside the turn table 23 in a planar view. The third cylindrical guide 70 integrally includes a rectangular flange portion 72, and the rectangular flange portion 72 is fastened to the pressure receiving mount 22 by a plurality of (in this example, four) fastening bolts 73. The one fastening bolt 73B (although it is the same as the fastening bolt 73, in order to identify the location, an index B is added) among those bolts is located below the turn table 23.

Since the second cylindrical guide 69 employs the same structure as that of the third cylindrical guide 70, the same reference numeral will be given to each component and the detailed description thereof will be omitted.

Since the one fastening bolt 73B is placed below the turn table 23, the tie bars 31B and 31C can be positioned so as to be near the turn table 23, preventing the mold-clamping machine 20 from increasing the size.

Figure 5:
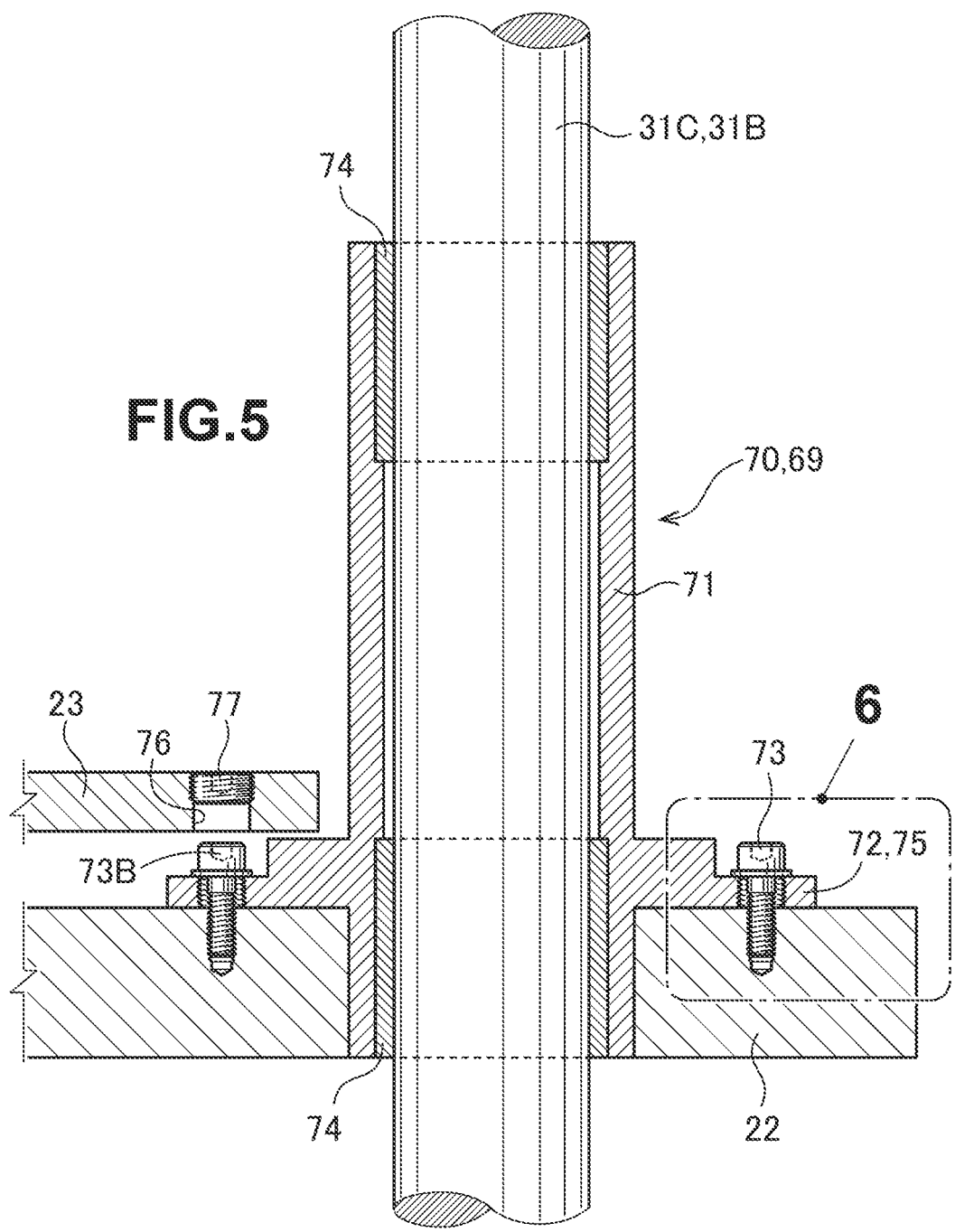
FIG. 5 is a cross-sectional view taken along a line 5-5 in FIG. 4.

As illustrated in FIG. 5, the third cylindrical guide 70 includes a cylindrical portion 71 in which slide bearings 74 placed in the vertical direction so as to be apart from each other are built, and the rectangular flange portion 72 integrally formed with the cylindrical portion 71.

The rectangular flange portion 72 is an intermediate-position flange 75 provided at an intermediate position in the height direction of the cylindrical portion 71 so as to be mounted on the pressure receiving mount 22.

An unlubricated bushing is suitable as the slide bearing 74. An unlubricated bushing is formed of a material in which graphite (black lead), molybdenum disulfide, etc., is impregnated. Since graphite or molybdenum disulfide is a solid lubricant, it can accomplish a lubrication performance for a long-time period without lubrication.

A clearance is established between the outer circumferential surface of the third tie bar 31C and the inner circumferential surface of the slide bearing 74. This clearance allows the third tie bar 31C to smoothly move up and down relative to the slide bearings 74.

A service hole 76 is formed in the turn table 23, and a blank plug 77 is screwed in the service hole 76. The turn table 23 is turned in such a way that the service hole 76 is located right above the fastening bolt 73B. Next, the blank plug 77 is removed.

Subsequently, a hex wrench is inserted from the upper side, the fastening bolt 73B is turned and removed from the intermediate-position flange 75, and is collected through the service hole 76.

This is how the fastening bolt 73 can be placed below the turn table 23.

Figure 6:
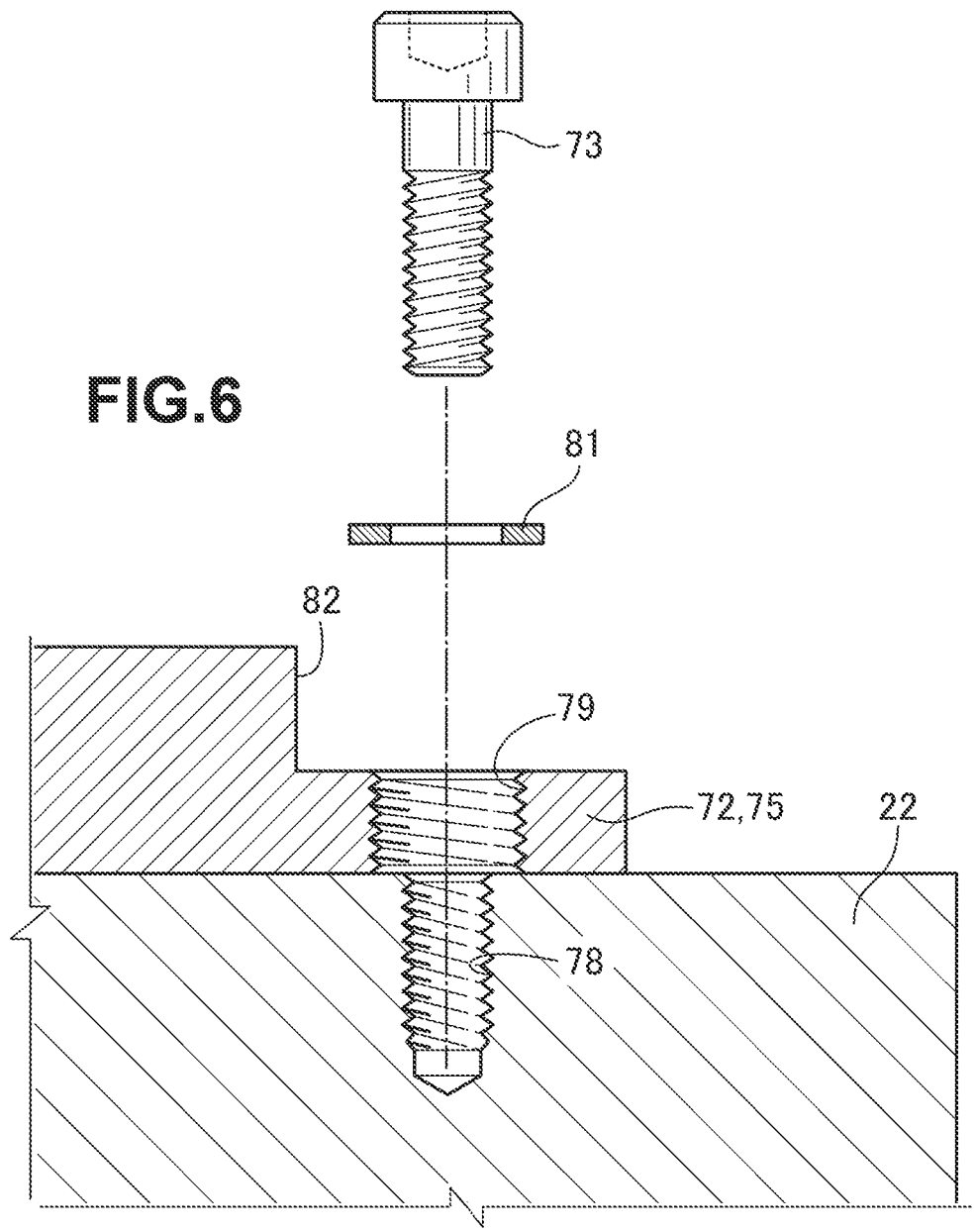
FIG. 6 is an exploded diagram with a part 6 in FIG. 5 enlarged.

As illustrated in FIG. 6, the pressure receiving mount 22 is provided with a female screw 78 with a screw-hole diameter corresponding to the fastening bolt 73.

Moreover, the intermediate-position flange 75 is provided with a female screw portion 79. The female screw portion 79 also serves as a bolt hole through which the fastening bolt 73 passes.

Ordinary bolt holes are slightly enlarged from the shaft diameter of the fastening bolt 73. In contrast, the female screw portion 79 according to the present disclosure is designed so as to have a sufficiently large diameter than such bolt holes. Accordingly, the female screw portion 79 has a sufficiently large diameter than that of the female screw 78 therebelow.

Since the female screw portion 79 has a large diameter, a plain washer 81 with a sufficiently large diameter is placed on the intermediate-position flange 75, and the head of the fastening bolt 73 is placed on the plain washer 81. The plain washer 81 prevents the head of the fastening bolt 73 from falling in the female screw portion 79.

Moreover, a counterbore 82 with a depth corresponding to the sum of the thickness of the plain washer 81 and the thickness of the head of the fastening bolt 73 is formed in the intermediate-position flange 75. This prevents the head of the fastening bolt 73 from protruding upwardly from the intermediate-position flange 75.

Hence, a concern such that the fastening bolt (see FIG. 5, reference numeral 73B) contacts the turn table 23 can be addressed, and the thickness of the intermediate-position flange 75 other than the counterbore 82 can be sufficiently secured.

Next, an action of a jack-up bolt 84 will be described with reference to FIGS. 7A to 7D. Note that the jack-up bolt 84 is a different bolt from the fastening bolt (see FIG. 6, reference numeral 73).

Figure 7A:
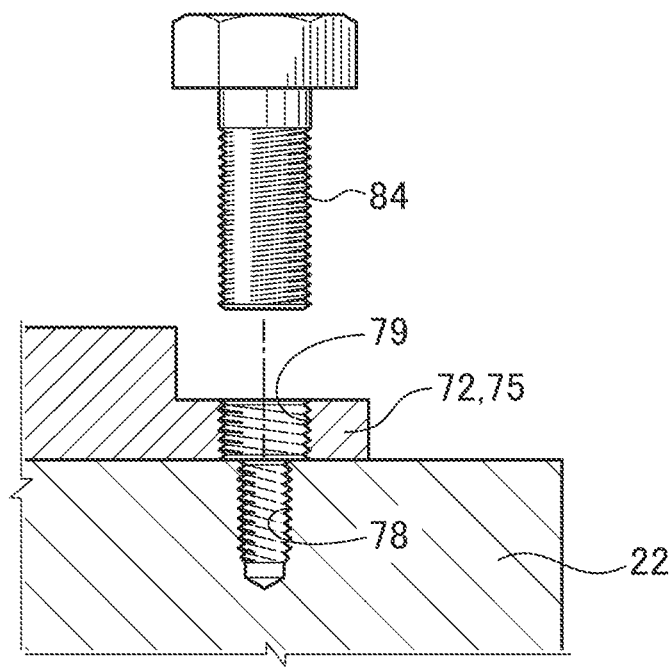
FIGS. 7A to 7D are each a diagram for describing an action of a jack-up bolt.

As illustrated in FIG. 7A, the jack-up bolt 84 is screwed in the female screw portion 79. The jack-up bolt 84 may be an ordinary hexagon headed bolt.

Figure 7B:
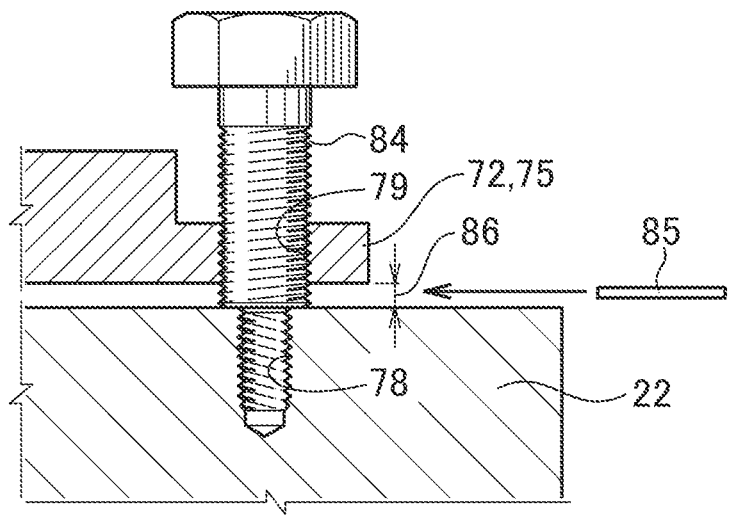

As illustrated in FIG. 7B, a tip (a lower end in the figure) of the jack-up bolt 84 contacts the pressure receiving mount 22. When it is further screwed in, the intermediate-position flange 75 is lifted up. Consequently, a clearance 86 for placing a shim 85 is formed between the pressure receiving mount 22 and the intermediate-position flange 75.

The role of the jack-up bolt 84 is to lift up the intermediate-position flange 75. After the shim 85 is placed, the jack-up bolt 84 is rotated in the reverse direction, and is collected through a state in FIG. 7A, and is stored.

In FIG. 7B, since the outer diameter of the jack-up bolt 84 is sufficiently larger than the bore diameter of the female screw 78 therebelow, the jack-up bolt 84 does not fall in the female screw 78. However, since there is a possibility such that the female screw 78 is damaged, it is preferable to take measures.

Figure 7C:
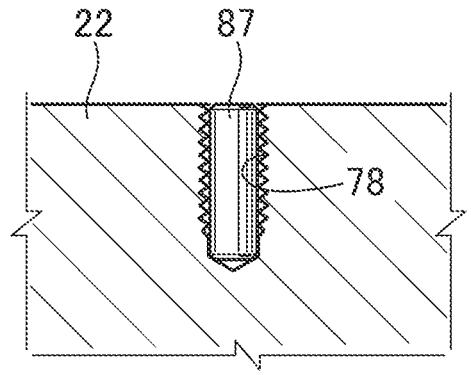

For example, as illustrated in FIG. 7C, a round bar 87 is inserted in the female screw 78, and this round bar 87 prevents the jack-up bolt 84 from falling therein.

Figure 7D:
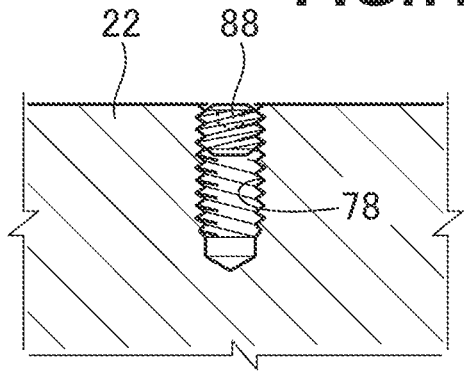

Alternatively, as illustrated in FIG. 7D, a blank plug 88 may be fitted in the female screw 78, and the blank plug 88 may prevent the jack-up bolt 84 from falling therein.

Next, an action of the shim 85 will be described with reference to FIGS. 8A and 8B.

Figure 8A:
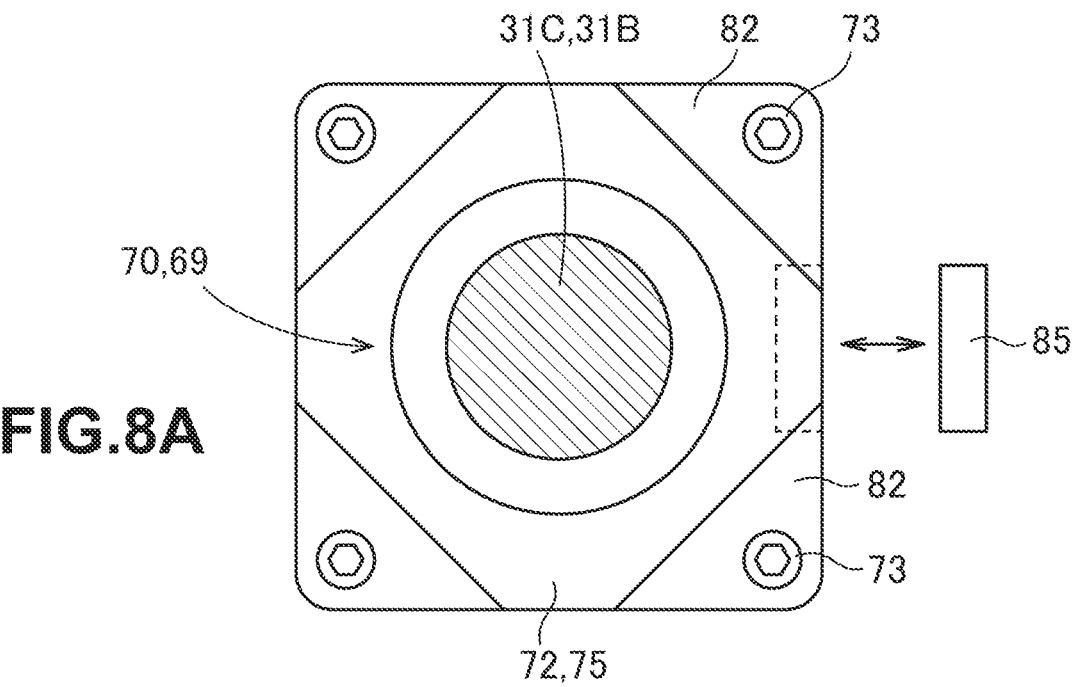
FIGS. 8A and 8B are each a diagram for describing an action of a shim.

As illustrated in FIG. 8A, the shim 85 is a thin metal strip that can be fitted between the adjacent fastening bolts 73. The shim 85 may be a thin strip sheet, or may be formed by laminating a plurality of thin strips that have different thicknesses.

Figure 8B:
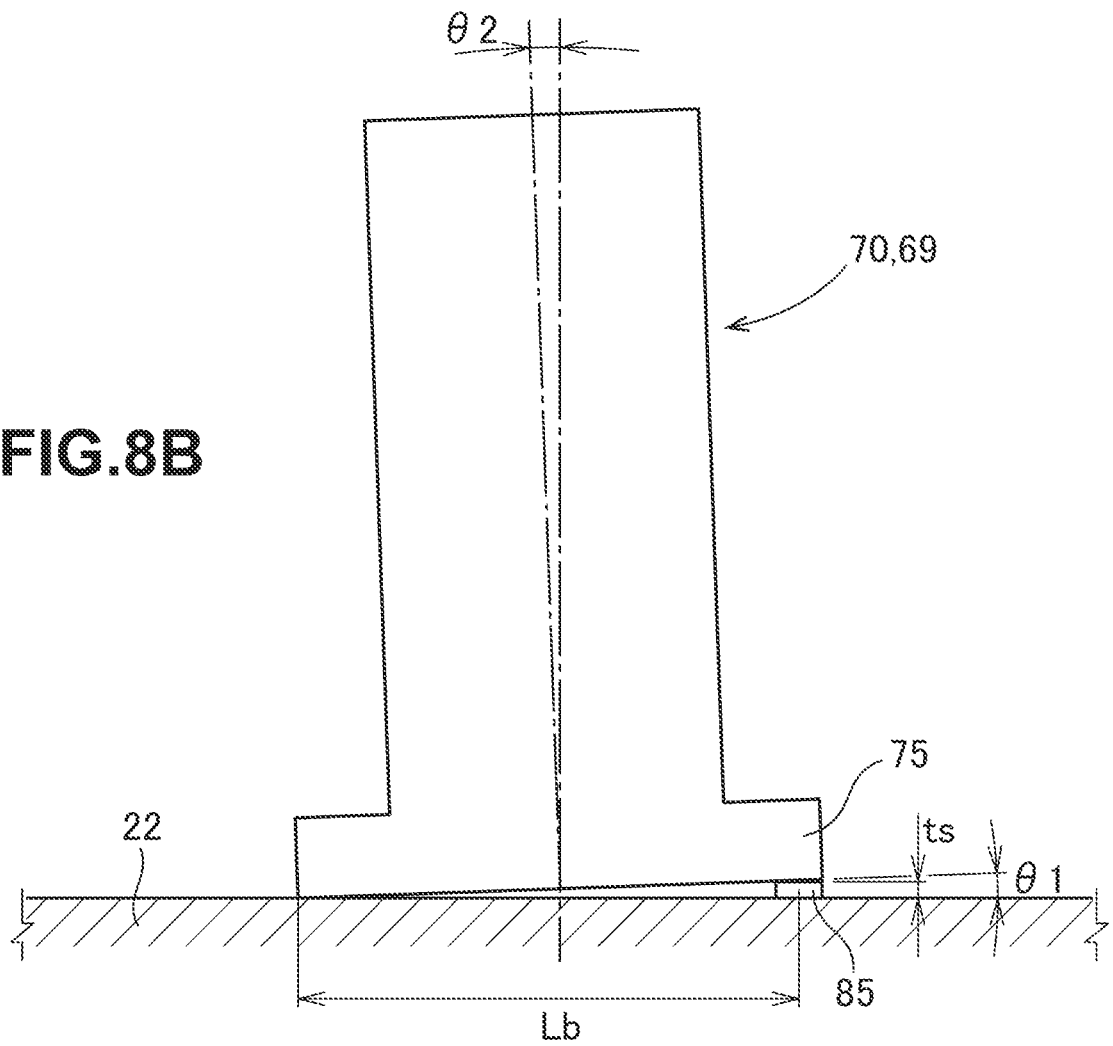

As illustrated in FIG. 8B, when the shim 85 is inserted, the intermediate-position flange 75 inclines by an angle $\theta1$ relative to the pressure receiving mount 22. Consequently, the third cylindrical guide 70 inclines by an angle $\theta2$ relative to the vertical axis. The angle $\theta2$ is equal to the angle $\theta1$.

The angle $\theta1$ can be easily obtained by a calculation that is: thickness ts of shim 85/(length Lb of side of intermediate-position flange)=$\tan \theta1$.

Next, a work of correcting a parallelism of the movable mount 28 will be described with reference to FIGS. 9A and 9B.

Figure 9A:
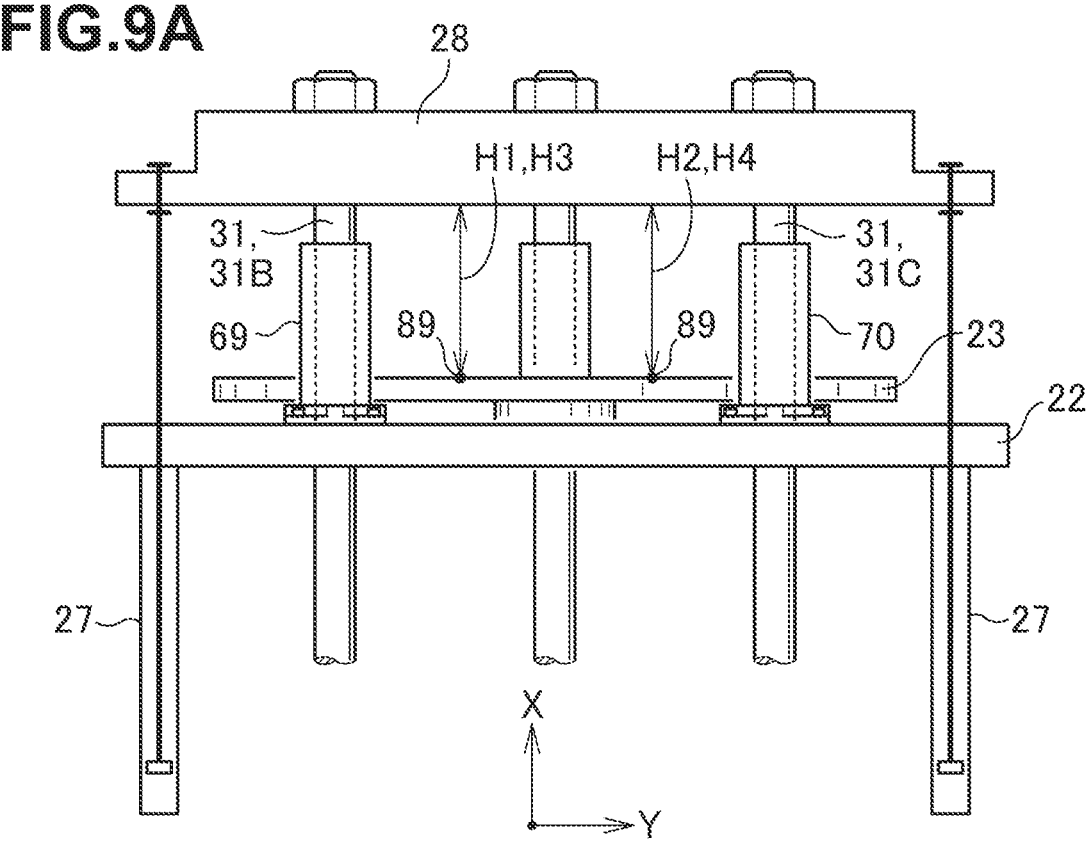
FIGS. 9A and 9B are each a diagram for describing a procedure of adjusting a parallelism of a movable mount.

As illustrated in FIG. 9A, the movable mount 28 is moved up by the mold opening-and-closing mechanism 27, and a clearance between the turn table 23 and the movable mount 28 is maintained at the maximum thickness of the metal mold (see FIG. 1, reference numeral 12).

In this state, clearances (H1 to H4) between the turn table 23 and the movable mount 28 are measured at a plurality of measurement points 89, respectively. Although a measurement mechanism for the measurement is optional, the measurement may be carried out by a dial gauge.

According to the present disclosure, the inclination (a degree of verticality) of the second cylindrical guide 69 and/or the third cylindrical guide 70 is corrected. Such a correction also enables the correction of the inclination (the degree of verticality) of the second tie bar 31B and/or the third tie bar 31C. Such a correction further corrects the clearances (H1 to H4) between the turn table 23 and the movable mount 28. Hence, the movable mount 28 is made in parallel with the pressure receiving mount 22.

Figure 9B:
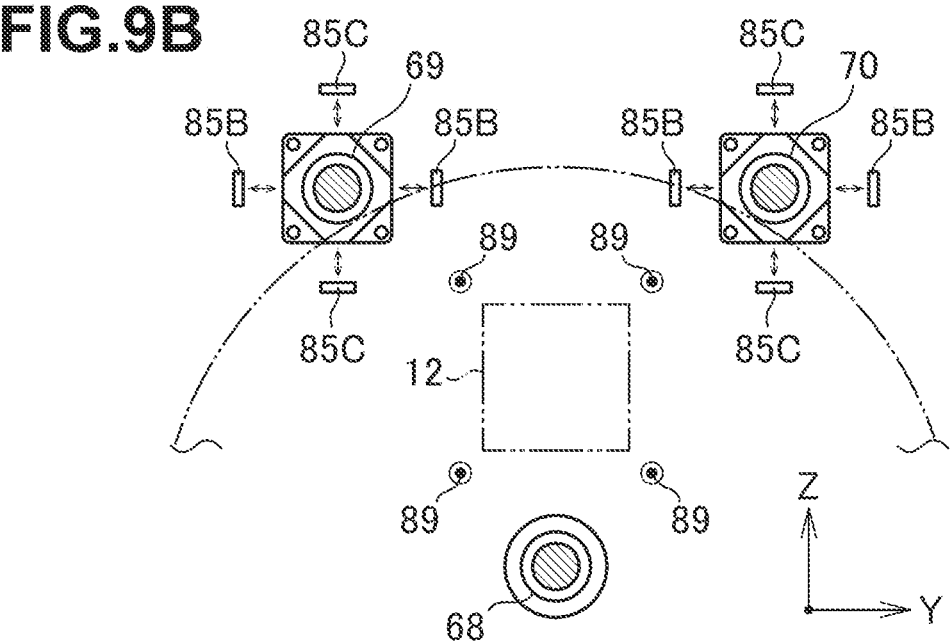

In FIG. 9B, since the first cylindrical guide 68 located at the center of the turn table has a connection with the turn table, the attachment structure to the pressure receiving mount 22 becomes complicated because of the second and third cylindrical guides 69 and 70 located outside the turn table.

If the first cylindrical guide 68 located at the center of the turn table is adjusted using a shim, the structure of the first cylindrical guide 68 becomes further complicated.

Hence, according to the present disclosure, the complicated first cylindrical guide 68 is not subjected to adjustment using a shim, but the simple second and third cylindrical guides 69 and 70 are subjected to adjustment using shims.

That is, after the clearances (H1 to H4) are measured, the degree of verticality of the second cylindrical guide 69 and that of the third cylindrical guide 70 are corrected so as to correct the parallelism. Since the clearance is provided between the tie bar 31 and the slide bearing 74, even if the degree of verticality of the first cylindrical guide 68 is not corrected, the parallelism can be corrected.

More specifically, the measurement points 89 are set as four sites near the four corners of the metal mold 12 indicated by an imaginary line, respectively.

An insertion plan of the shim 85 is made based on the obtained measurement values.

The third cylindrical guide 70 can be inclined around the Z-axis by inserting a shim 85B in one side among the four sides of the rectangular flange portion of the third cylindrical guide 70.

The third cylindrical guide 70 can be inclined around the Y-axis by inserting a shim 85C in another one side.

The same is true of the second cylindrical guide 69.

A clearance is formed by the jack-up bolt.→The shim 85B and/or the shim 85C is inserted.→The jack-up bolt is replaced with the fastening bolt 73.→The fastening bolt 73 is tightened.→As illustrated in FIG. 9A, the clearances (H1 to H4) between the turn table 23 and the movable mount 28 are measured.→The fastening bolt 73 is replaced with the jack-up bolt.→A clearance is formed by the jack-up bolt.→The shim 85B and/or the shim 85C is replaced.

The above works are repeated so as to set the difference in the clearances (H1 to H4) between the turn table 23 and the movable mount 28 to be an allowable value.

In the above example, the jack-up bolt (see FIG. 7, reference numeral 84) is essential. However, storage of the jack-up bolt is inconvenient, and there is also a possibility of lost. Moreover, it is inconvenient to replace the jack-up bolt with the fastening bolt. An example in which such an inconvenience can be addressed will be described with reference to FIG. 10.

Figure 10:
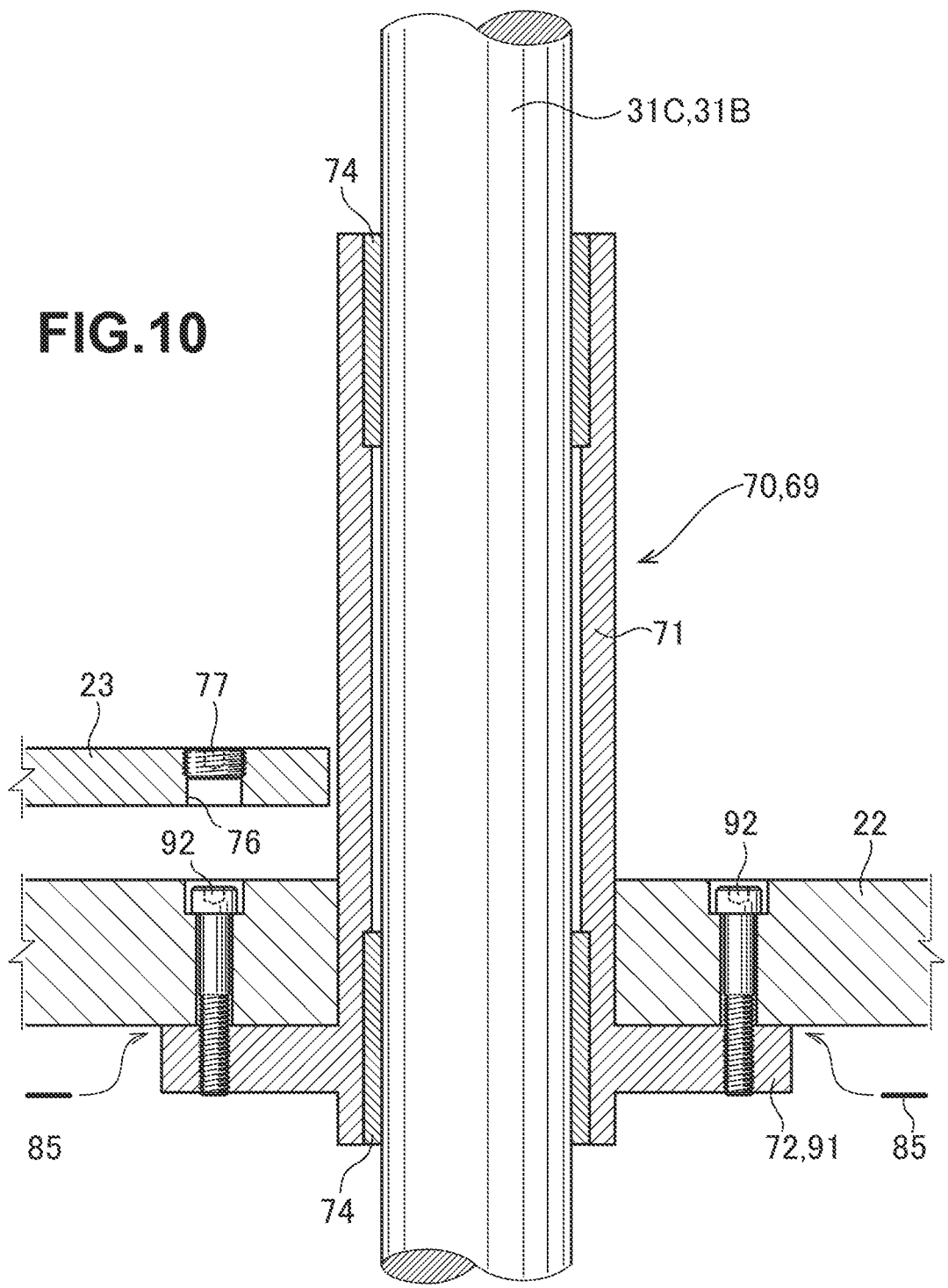
FIG. 10 is a diagram for describing a modified example of a cylindrical guide.

As illustrated in FIG. 10, the third cylindrical guide 70 includes the cylindrical portion 71 provided with built-in slide bearings 74 at the upper and lower ends, respectively, and the rectangular flange portion 72 integrally formed with the cylindrical portion 71.

The rectangular flange portion 72 is a lower-position flange 91 provided at a lower position in the height direction of the cylindrical portion 71 so as to contact the pressure receiving mount 22 from the bottom side.

The lower-position flange 91 is fastened to the pressure receiving mount 22 by long bolts 92 which pass completely through the pressure receiving mount 22 from the upper side to the lower side.

The long bolts 92 also serve as the Jack-up bolts.

That is, when the long bolt 92 is loosened, the lower-position flange 91 moves down relative to the pressure receiving mount 22. Consequently, a clearance to insert the shim 85 can be formed between the pressure receiving mount 22 and the lower-position flange 91.

Since the jack-up bolt is unnecessary, an inconvenience such that the jack-up bolt is lost can be addressed. In addition, a bothersome work of replacing the fastening bolt with the jack-up bolt is eliminated.

Note that in the embodiments, although the flange portion 72 is rectangular, it may be a triangular flange or a multi-angular flange equal to or greater than five corners.

Moreover, the half nut position adjusting hydraulic cylinder 24A, the mold opening-and-closing hydraulic cylinder 27A, the half nut opening-and-closing hydraulic cylinder 37A, the injection apparatus moving hydraulic cylinder 51A, the injection cylinder 54A, and the pin moving hydraulic cylinder 62A may be changed to respective electric cylinders. In this case, the pump motor unit 32 illustrated in FIG. 1 is changed to a control unit.

INDUSTRIAL APPLICABILITY

The present disclosure is suitable for a vertical-style mold-clamping machine.

REFERENCE SIGNS LIST

12 Metal mold
16 Floor or machine stand
20 Mold-clamping machine
21 Bed
22 Pressure receiving mount
23 Turn table
25 Mold-clamping mechanism
26 Half nut
28 Movable mount
29 Traction mount
31 Tie bar
31A First tie bar
31B Second tie bar
31C Third tie bar
36 Engage portion
68 First cylindrical guide
69 Second cylindrical guide
70 Third cylindrical guide
71 Cylindrical portion
72 Rectangular flange portion
73 Fastening bolt
75 Intermediate-position flange
79 Female screw portion
84 Jack-up bolt
85, 85B, 85C Shim
91 Lower-position flange
92 Long bolt

The invention claimed is:

1. A mold-clamping machine comprising:
a bed fastened to a floor or a machine stand;
a pressure receiving mount fastened to the bed;
a turn table mounted on the pressure receiving mount so as to be freely turnable;
a movable mount placed at a position higher than the turn table;
a traction mount placed at a position lower than the pressure receiving mount;
a tie bar which is attached to the movable mount so as to extend downwardly, and which passes completely through the pressure receiving mount and the traction mount; and
a mold-clamping mechanism that moves down the traction mount relative to the pressure receiving mount so as to move down the tie bar and the movable mount,
wherein an engage portion is provided at a lower end of the tie bar, and a half nut that is engaged with the engage portion is provided under the traction mount,
wherein the mold-clamping machine clamps a metal mold placed between the turn table and the movable mount,
wherein the tie bar comprises:
a first tie bar placed at a rotation center of the turn table; and
second and third tie bars placed outside the turn table in a planar view,
wherein each of the first to third tie bars is supported so as to be freely movable up and down by each of first to third cylindrical guides provided at the pressure receiving mount, and
wherein the second cylindrical guide and the third cylindrical guide each integrally include a rectangular flange portion fastened to the pressure receiving mount, and respective attachment attitudes of the second cylindrical guide and the third cylindrical guide are adjustable by placing a shim between one of a plurality of sides of the rectangular flange portion and the pressure receiving mount.

2. The mold-clamping machine according to claim 1, wherein:
the rectangular flange portion is an intermediate-position flange mounted on the pressure receiving mount; and
the intermediate-position flange comprises a detachable jack-up bolt utilized when the shim is inserted or replaced, and the intermediate-position flange is lifted up from the pressure receiving mount by the jack-up bolt.

3. The mold-clamping machine according to claim 2, wherein:
the second cylindrical guide and the third cylindrical guide are each fastened to the pressure receiving mount by a fastening bolt;
the jack-up bolt is screwed in a female screw portion provided at the intermediate-position flange when the fastening bolt is detached; and
the female screw portion also serves as a bolt hole for the fastening bolt.

4. The mold-clamping machine according to claim 1, wherein:
the rectangular flange portion is a lower-position flange that contacts a lower surface of the pressure receiving mount, and the lower-position flange is fastened to the pressure receiving mount by a mounting bolt that passes completely through the pressure receiving mount from an upper side to a lower side; and
a clearance to insert the shim is formed between the pressure receiving mount and the lower-position flange by loosening the mounting bolt.

5. The mold-clamping machine according to claim 1, wherein:
   the rectangular flange portion of each of the second cylindrical guide and the third cylindrical guide is fastened to a face of the pressure receiving mount such that at least a portion of the rectangular flange portion of the second and third cylindrical guides is interposed between the turntable and the pressure receiving mount, and wherein the first to third cylindrical guides extend away from the pressure receiving mount, past the turntable, and toward the movable mount.

6. The mold-clamping machine according to claim 5, wherein:
   the rectangular flange portion is an intermediate-position flange mounted on the pressure receiving mount; and
   the intermediate-position flange comprises a detachable jack-up bolt utilized when the shim is inserted or replaced, and the intermediate-position flange is lifted up from the pressure receiving mount by the jack-up bolt.

7. The mold-clamping machine according to claim 6, wherein:
   the second cylindrical guide and the third cylindrical guide are each fastened to the pressure receiving mount by a fastening bolt;
   the jack-up bolt is screwed in a female screw portion provided at the intermediate-position flange when the fastening bolt is detached; and
   the female screw portion also serves as a bolt hole for the fastening bolt.

* * * * *